(12) United States Patent
Beeney et al.

(10) Patent No.: US 11,545,704 B2
(45) Date of Patent: Jan. 3, 2023

(54) MODULE DETECTION IN BATTERY PACK (71) Applicant: Ford Global Technologies, LLC, Dearborn, MI (US)

(72) Inventors: Michael David Beeney, Canton, MI (US); Thomas J. Coupar, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 239 days.

(21) Appl. No.: 16/952,976

(22) Filed: Nov. 19, 2020

(65) Prior Publication Data

US 2022/0158261 A1   May 19, 2022

(51) Int. Cl.
| | |
|---|---|
| *H01M 10/44* | (2006.01) |
| *H01M 10/42* | (2006.01) |
| *H02J 7/00* | (2006.01) |
| *B60L 50/60* | (2019.01) |
| *B60L 58/18* | (2019.01) |
| *B60K 6/28* | (2007.10) |

(52) U.S. Cl.
CPC ........... *H01M 10/441* (2013.01); *B60L 50/66* (2019.02); *B60L 58/18* (2019.02); *H01M 10/425* (2013.01); *H02J 7/0013* (2013.01); *H02J 7/0047* (2013.01); *B60K 6/28* (2013.01); *B60Y 2200/91* (2013.01); *B60Y 2200/92* (2013.01); *H01M 2010/4271* (2013.01); *H01M 2220/20* (2013.01)

(58) Field of Classification Search
CPC ............. H01M 10/441; H01M 10/425; H01M 2010/4271; H01M 2220/20; H01M 50/249; H01M 50/204; B60L 50/66; B60L 58/18; H02J 7/0013; H02J 7/0047; H02J 7/00; B60K 6/28; B60Y 2200/91; B60Y 2200/92; Y02E 60/10; Y02T 10/70; G01R 31/36
USPC ........................................................ 320/118
See application file for complete search history.

(56) References Cited

U.S. PATENT DOCUMENTS

| | | | |
|---|---|---|---|
| 7,960,943 B2 | 6/2011 | Gamboa et al. | |
| 9,205,750 B2 * | 12/2015 | Bernardi | H02J 7/0048 |
| 9,919,608 B2 | 3/2018 | Wang et al. | |
| 11,084,387 B2 * | 8/2021 | Herring | G06N 20/00 |

(Continued)

FOREIGN PATENT DOCUMENTS

| | | | | |
|---|---|---|---|---|
| CN | 107683222 A | * | 2/2018 | .......... B60L 11/1864 |
| CN | 105904992 B | | 8/2018 | |

*Primary Examiner* — M Baye Diao
(74) *Attorney, Agent, or Firm* — David B Kelley; Brooks Kushman P.C.

(57) ABSTRACT

A vehicle includes an electric machine, a traction battery pack, and a battery controller. The traction battery pack includes a plurality of cell modules electrically connected with the electric machine. Each of the cell modules includes a housing having a battery cell, a passive circuit element isolated from the battery cell, and a module controller contained therein. The passive circuit elements are electrically connected in series or parallel. The battery controller is in communication with each of the module controllers and is electrically connected with the passive circuit elements. Responsive to signals from the module controllers indicative of a total number of the cell modules and a measured parameter associated with the passive circuit elements being indicative of a same total number of the cell modules, the battery controller operates the battery cells according to power limits defined by the total number.

19 Claims, 6 Drawing Sheets

(56) References Cited

U.S. PATENT DOCUMENTS

| | | | |
|---|---|---|---|
| 11,152,796 B2* | 10/2021 | Wang | H02M 7/4835 |
| 11,218,005 B2* | 1/2022 | Winters | H02J 7/0048 |
| 2019/0148952 A1* | 5/2019 | Remboski | H02J 7/00309 |
| | | | 320/128 |
| 2021/0265710 A1* | 8/2021 | Muenzel | H02J 7/0016 |

* cited by examiner

MODULE DETECTION IN BATTERY PACK

TECHNICAL FIELD

The present disclosure relates to the control and operation of battery packs.

BACKGROUND

Modular battery packs may be used in vehicles or home energy storage applications. In an electric vehicle application, a modular battery pack may have a plurality of battery modules that are changeable or swappable to provide improved performance and flexibility.

SUMMARY

A vehicle traction battery system includes a high voltage bus, a primary controller, and a plurality of cell modules. Each of the cell modules includes a battery cell, a resistive element isolated from the battery cell, and a secondary controller in communication with the primary controller. The battery cells are electrically connected with the high voltage bus and the resistive elements are electrically connected in series or parallel and electrically connected with the primary controller. The primary controller, responsive to signals from the secondary controllers indicative of a total number of the cell modules and a measured resistance of the resistive elements being indicative of a same total number of the cell modules, operates the battery cells according to power limits defined by the total number. The primary controller further, responsive to the signals and the measured resistance being indicative of different total numbers of the cell modules, sets an error flag.

A vehicle traction battery system includes a primary controller and a plurality of cell modules each including a battery cell, a passive circuit element isolated from the battery cell, and a secondary controller in communication with the primary controller. The passive circuit elements are electrically connected in series or parallel and electrically connected with the primary controller. The primary controller, responsive to signals from the secondary controllers indicative of a total number of the cell modules and a measured parameter associated with the passive circuit elements being indicative of a same total number of the cell modules, operates the battery cells according to power limits defined by the total number. The primary controller further, responsive to the signals and the measured parameter being indicative of different total numbers of the cell modules, sets a flag indicating an error.

A vehicle includes an electric machine and a traction battery pack including a plurality of cell modules. Each of the cell modules includes a housing having a battery cell, a passive circuit element isolated from the battery cell, and a module controller contained therein. The passive circuit elements are electrically connected in series or parallel. The vehicle also includes a battery controller in communication with each of the module controllers and electrically connected with the passive circuit elements. The battery controller, responsive to signals from the module controllers indicative of a total number of the cell modules and a measured parameter associated with the passive circuit elements being indicative of a same total number of the cell modules, operates the battery cells according to power limits defined by the total number.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The present disclosure, among other things, proposes a system for measuring the number of cell battery modules in a modular battery pack.

Figure 1:
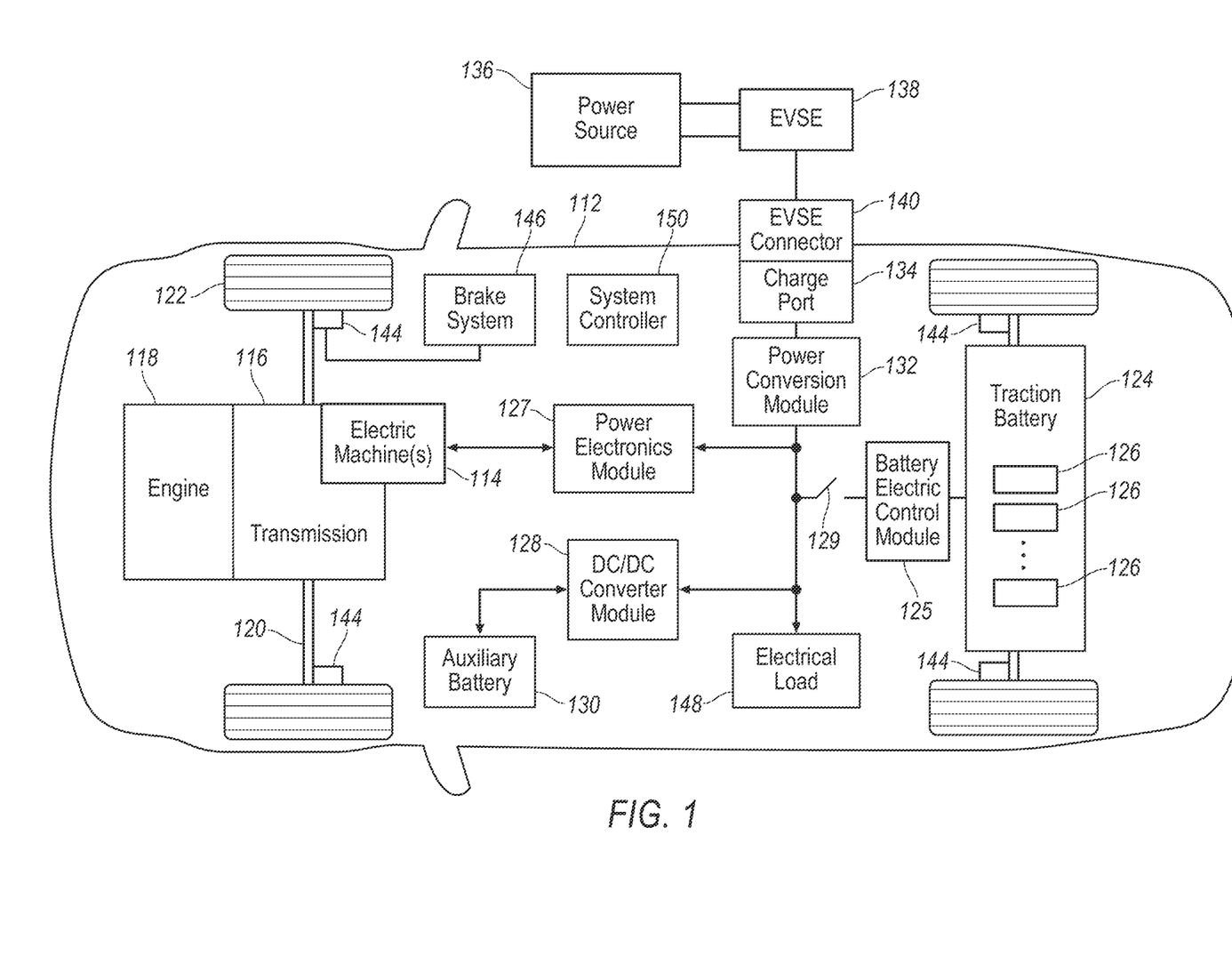
FIG. 1 is an example block topology of an electrified vehicle illustrating drivetrain and energy storage components.

FIG. 1 illustrates a plug-in hybrid-electric vehicle (PHEV). A plug-in hybrid-electric vehicle 112 may comprise one or more electric machines (electric motors) 114 mechanically coupled to a hybrid transmission 116. The electric machines 114 may be capable of operating as a motor or a generator. In addition, the hybrid transmission 116 is mechanically coupled to an engine 118. The hybrid transmission 116 is also mechanically coupled to a drive shaft 120 that is mechanically coupled to the wheels 122. The electric machines 114 may provide propulsion and deceleration capability when the engine 118 is turned on or off. The electric machines 114 may also act as generators and may provide fuel economy benefits by recovering energy that would be lost as heat in the friction braking system. The electric machines 114 may also reduce vehicle emissions by allowing the engine 118 to operate at more efficient speeds and allowing the hybrid-electric vehicle 112 to be operated in electric mode with the engine 118 off under certain conditions.

A traction battery or battery pack 124 stores energy that may be used by the electric machines 114. The vehicle battery pack 124 may provide a high voltage DC output. The traction battery 124 may be electrically coupled to one or more battery electric control module (BECM) 125. The BECM may be provided with one or more processors and software applications configured to monitor and control various operations of the traction battery 124. The traction battery 124 may include one or more modular battery packs.

Each modular battery pack may include a plurality of rechargeable cell battery modules 126 that are installed to the traction battery pack 124 in a removable and interchangeable manner to provide flexibility. For instance, the traction battery pack 124 may be provided with one or more battery module compartments (not shown) to accommodate the battery modules 126. Racks, tracks and brackets (not shown) may be provided to facilitate the installation and removal of the battery modules 126. Each of the battery modules 126 may be individually installed or removed from the battery pack 124. As an example, responsive to detecting a battery module 126 is low on charge, the BECM 125 may output a message to a vehicle user to inform about the low state-of-charge (SOC) of the module 126. The vehicle user may access the battery pack 124 and individually remove the identified module 126 for a recharge. Although the vehicle 112 may be provided capability to recharge the battery 124, being able to remove the empty battery module 126 and recharge it off-board may provide more flexibility. Additionally, the empty battery module 126 may be swapped with a fully charged battery module 126 to further enhance the flexibility provided by the modular battery pack 124. It should be noted that the vehicle 112 may not require all battery modules 126 to be installed in the traction battery pack 124 to be able to operate. In other words, the vehicle 112 may be driven when one or more of the battery modules 126 are missing from the module battery pack 124.

The traction battery 124 may be further electrically coupled to one or more power electronics modules 127. The power electronics module 127 may also be referred to as a power inverter. One or more contactors 129 may isolate the traction battery 124 and the BECM 125 from other components when opened and couple the traction battery 124 and the BECM 125 to other components when closed. The power electronics module 127 may also be electrically coupled to the electric machines 114 and provide the ability to bi-directionally transfer energy between the traction battery 124 and the electric machines 114. For example, a traction battery 124 may provide a DC voltage while the electric machines 114 may operate using a three-phase AC current. The power electronics module 127 may convert the DC voltage to a three-phase AC current for use by the electric machines 114. In a regenerative mode, the power electronics module 127 may convert the three-phase AC current from the electric machines 114 acting as generators to the DC voltage compatible with the traction battery 124. The description herein is equally applicable to a pure electric vehicle. For a pure electric vehicle, the hybrid transmission 116 may be a gear box connected to the electric machine 114 and the engine 118 may not be present.

In addition to providing energy for propulsion, the traction battery 124 may provide energy for other vehicle electrical systems. A vehicle may include a DC/DC converter module 128 that converts the high voltage DC output of the traction battery 124 to a low voltage DC supply that is compatible with other low-voltage vehicle loads. An output of the DC/DC converter module 128 may be electrically coupled to an auxiliary battery 130 (e.g., 12V battery).

The vehicle 112 may be a battery electric vehicle (BEV) or a plug-in hybrid electric vehicle (PHEV) in which the traction battery 124 may be recharged by an external power source 136. The external power source 136 may be a connection to an electrical outlet. The external power source 136 may be an electrical power distribution network or grid as provided by an electric utility company. The external power source 136 may be electrically coupled to electric vehicle supply equipment (EVSE) 138. The EVSE 138 may provide circuitry and controls to regulate and manage the transfer of energy between the power source 136 and the vehicle 112. The external power source 136 may provide DC or AC electric power to the EVSE 138. The EVSE 138 may have a charge connector 140 for plugging into a charge port 134 of the vehicle 112. The charge port 134 may be any type of port configured to transfer power from the EVSE 138 to the vehicle 112. The charge port 134 may be electrically coupled to a charger or on-board power conversion module 132. The power conversion module 132 may condition the power supplied from the EVSE 138 to provide the proper voltage and current levels to the traction battery 124. The power conversion module 132 may interface with the EVSE 138 to coordinate the delivery of power to the vehicle 112. The EVSE connector 140 may have pins that mate with corresponding recesses of the charge port 134. Alternatively, various components described as being electrically coupled may transfer power using wireless inductive coupling.

One or more wheel brakes 144 may be provided for decelerating the vehicle 112 and preventing motion of the vehicle 112. The wheel brakes 144 may be hydraulically actuated, electrically actuated, or some combination thereof. The wheel brakes 144 may be a part of a brake system 146. The brake system 146 may include other components to operate the wheel brakes 144. For simplicity, the figure depicts a single connection between the brake system 146 and one of the wheel brakes 144. A connection between the brake system 146 and the other wheel brakes 144 is implied. The brake system 146 may include a controller to monitor and coordinate the brake system 146. The brake system 146 may monitor the brake components and control the wheel brakes 144 for vehicle deceleration. The brake system 146 may respond to driver commands and may also operate autonomously to implement features such as stability control. The controller of the brake system 146 may implement a method of applying a requested brake force when requested by another controller or sub-function. One or more electrical loads 148 may be coupled to the high-voltage bus. The electrical loads 148 may have an associated controller that operates and controls the electrical loads 146 when appropriate. Examples of electrical loads 148 may be a heating module, an air-conditioning module or the like.

Figure 2A:
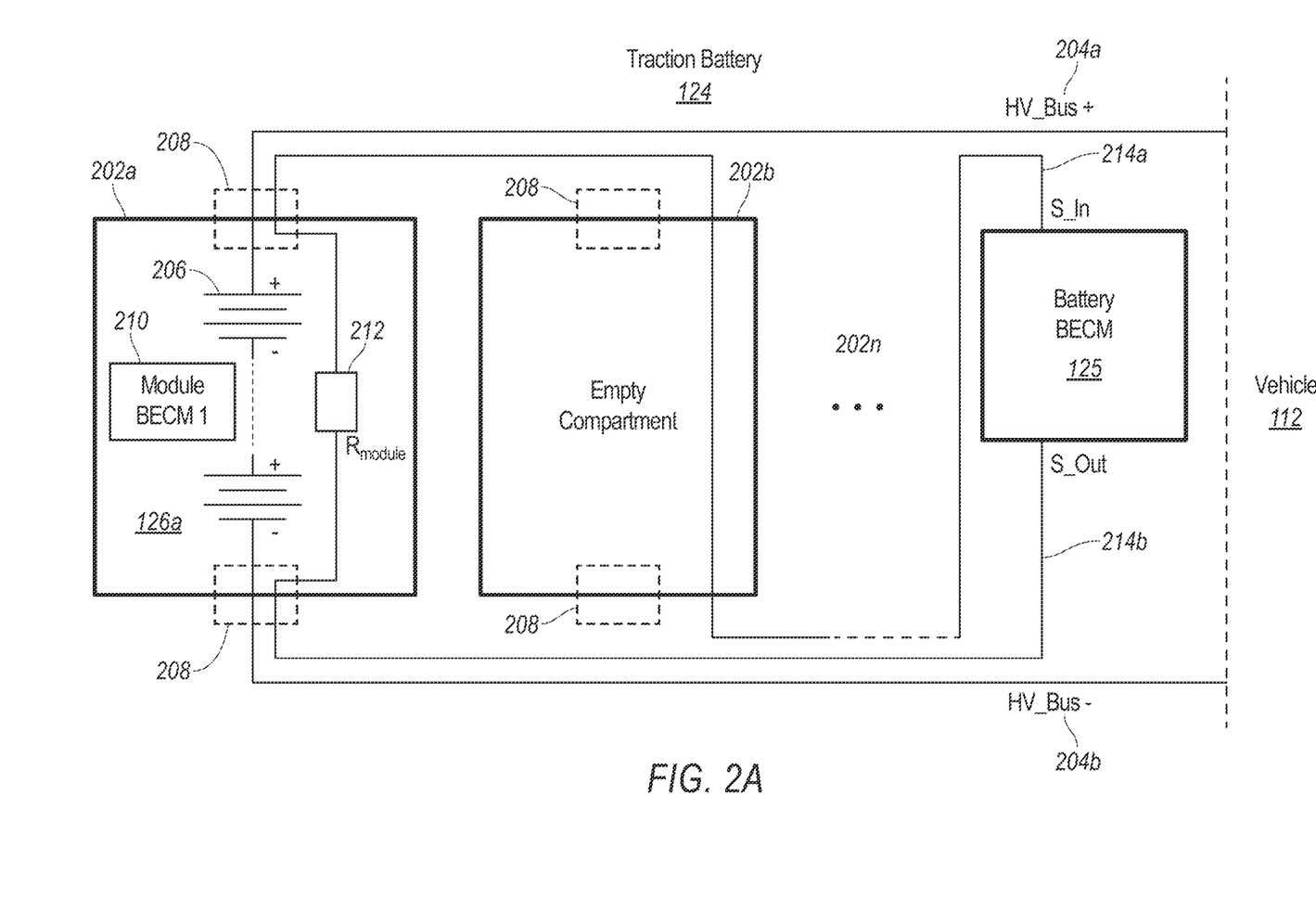
FIGS. 2A and 2B are example circuit diagrams of a modular battery pack.
Figure 2B:
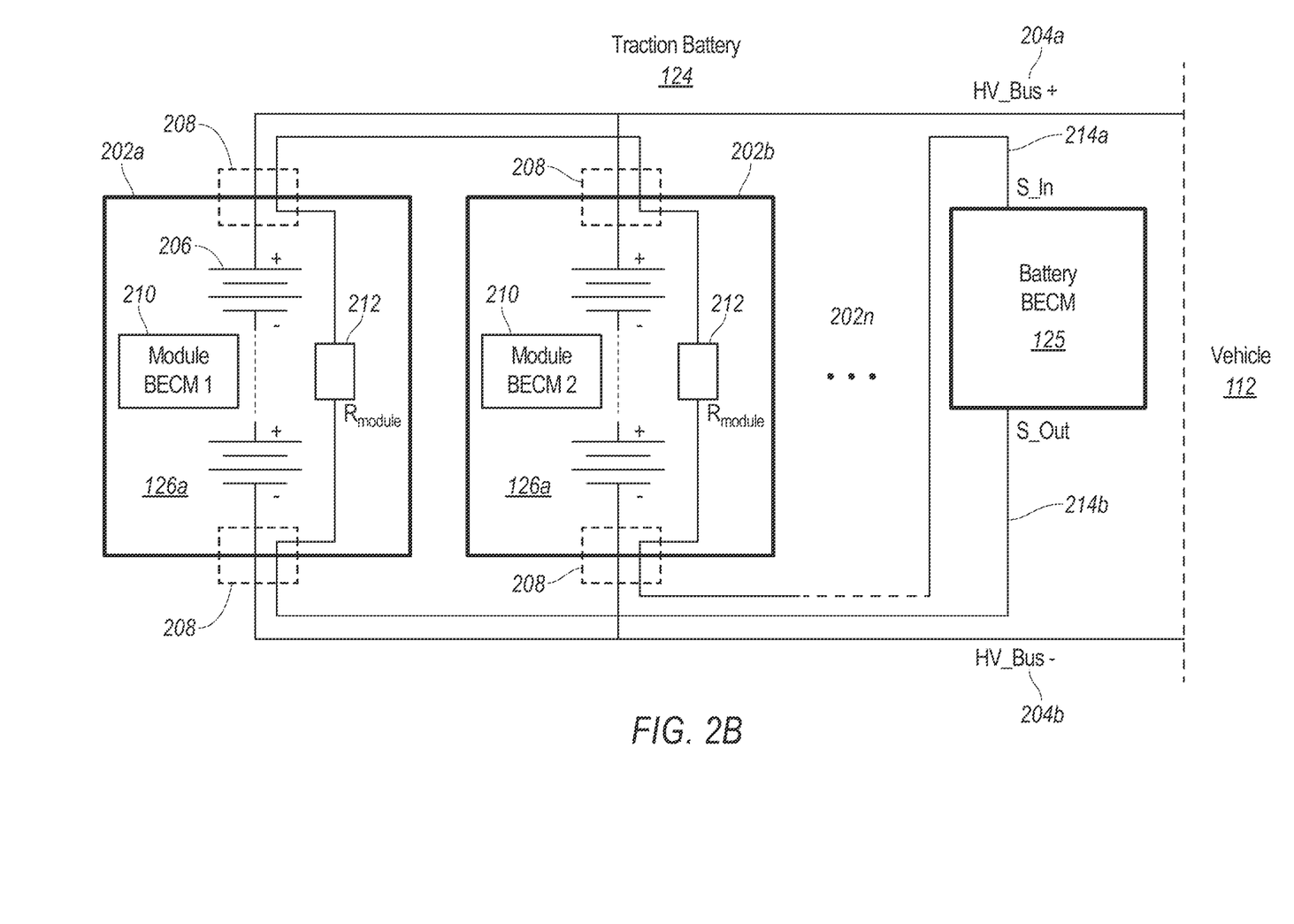

Referring to FIGS. 2A and 2B, example circuit diagrams of the modular traction battery pack circuit are illustrated. The traction battery 124 may be a modular battery pack having a plurality of battery module compartments 202 to support installation and removal of corresponding battery modules 126. It should be noted that although there are only two battery module compartments 202*a* and 202*b* illustrated, the present embodiment is not limited to that number, and the modular battery pack 124 may be configured to support any number of battery module compartments 202 as well as battery modules 126 connected in parallel or in series under substantially the same principle. In the present example, as illustrated in FIGS. 2A and 2B, each of the battery modules 126 may be connected in parallel between a positive high-voltage (HV) bus HV_Bus+ 204*a* and a negative HV_bus HV_Bus− 204*b*. Each of the battery modules 126 may include a plurality of battery cells 206 connected in series to obtain a desired output voltage and power of the battery module 126. Each of the battery module compartments 202 may be provided with one or more HV connectors 208 to connect the positive and negative terminals of the battery module 126 to the positive HV_Bus+ 204*a* and the negative HV_Bus− 204*b* of the traction battery pack 124 respectively. Each of the battery modules 126 may be provided with a battery module BECM 210 provided with one or more processors and software applications configured to monitor and control various operations of the respective battery module 126. The battery module BECM 210 may be further configured to communicate with the main BECM 125 of the traction battery pack 124 via a wired or wireless connection (not shown) to report the operating status of each respective battery module 126 to the main BECM 125. For instance, the battery module BECM 210 may measure a state-of-charge (SOC) of the battery module 126 and report the SOC to the main BECM 210. The main BECM 210 may coordinate the charge and discharge of each individual battery module 126 by sending control signals to the module BECM 210 to optimize the battery performance and flexibility. The main BECM 125 may be configured to detect the presence of each battery module 126 using communication signals received from the module BECM 210 of each respective battery module 126. For instance, responsive to a new battery module 126 being installed into the battery compartment 202, the module BECM 210 of the new battery module 126 may communicate with the main BECM 125 to report the installation and status of the new battery module 126. The main BECM 125 may mark the new battery module 126 and the corresponding battery compartment 202 as installed/occupied. Responsive to removal of the battery module 126 from the battery compartment 202, the main BECM 125 may no longer detect the communication signals from the respective module BECM 210 and mark the battery module 126 and the corresponding battery compartment 202 as removed/empty. Based on the occupied and empty status of battery compartment 202, the main BECM 125 may determine the number of battery modules 126 that are installed in the battery pack 124.

The main BECM 125 may be further configured to determine the number the battery modules 126 installed in the battery pack 124 based on a voltage and/or resistance measurement, in addition to or in lieu of, the signal communications from the module BECM 210 as discussed above. More specifically, each of the battery modules 126 may be provided with a module resistor 212 having a predetermined resistance value $R_{Module}$. In the example illustrated in FIGS. 2A and 2B, the module resistors 212 of each of the plurality of battery modules 126 are connected in series. The module resistors 212 may be connected to each other via the HV connectors 208 for instance, although the resistor circuit may be separated from the HV power supply circuit. If a battery compartment 202 is empty (e.g., 202b illustrated in FIG. 2A), a close circuit may be applied to provide substantially zero resistance between the HV contactors 208 of the battery compartment 202. The main BECM 125 may measure a total resistance of the battery compartments 202 between an input signal line S_In 214a and an output signal line S_Out 214b which includes the module resistors 212. Since the value $R_{Module}$ of module resistor 212 for each battery module is known to the main BECM 125, the BECM 125 may determine the number of module resistors 212 connected in series using the resistance measured between the input signal line S_In 214a and the output signal line S_Out 214b, such that the number of battery modules 126 installed in the battery pack 124 may be determined. Assuming each module resistor 212 has the same resistance value $R_{Module}$, the series resistance between the input and output signal lines may be calculated using the following equation:

$$R_{Series} = nR_{Module}$$

wherein n represents the number of module resistors presented in the circuit. Therefore, $$n = \frac{R_{Series}}{R_{Module}}$$

For instance, as illustrated in FIG. 2A, if the first battery module 202a is the only one installed, the resistance measured between the input signal line S_In 214a and the output signal line S_Out 214b will be equal to $R_{Module}$ indicating only one battery module 126 is installed. Referring to FIG. 2B, if a second is battery module 202b has been installed, the resistance measured between the input signal line S_In 214a and the output signal line S_Out 214b will be substantially $R_{Module}+R_{Module}$ which is equal to $2R_{Module}$ indicating two battery modules 126 are installed, etc.

Figure 3:
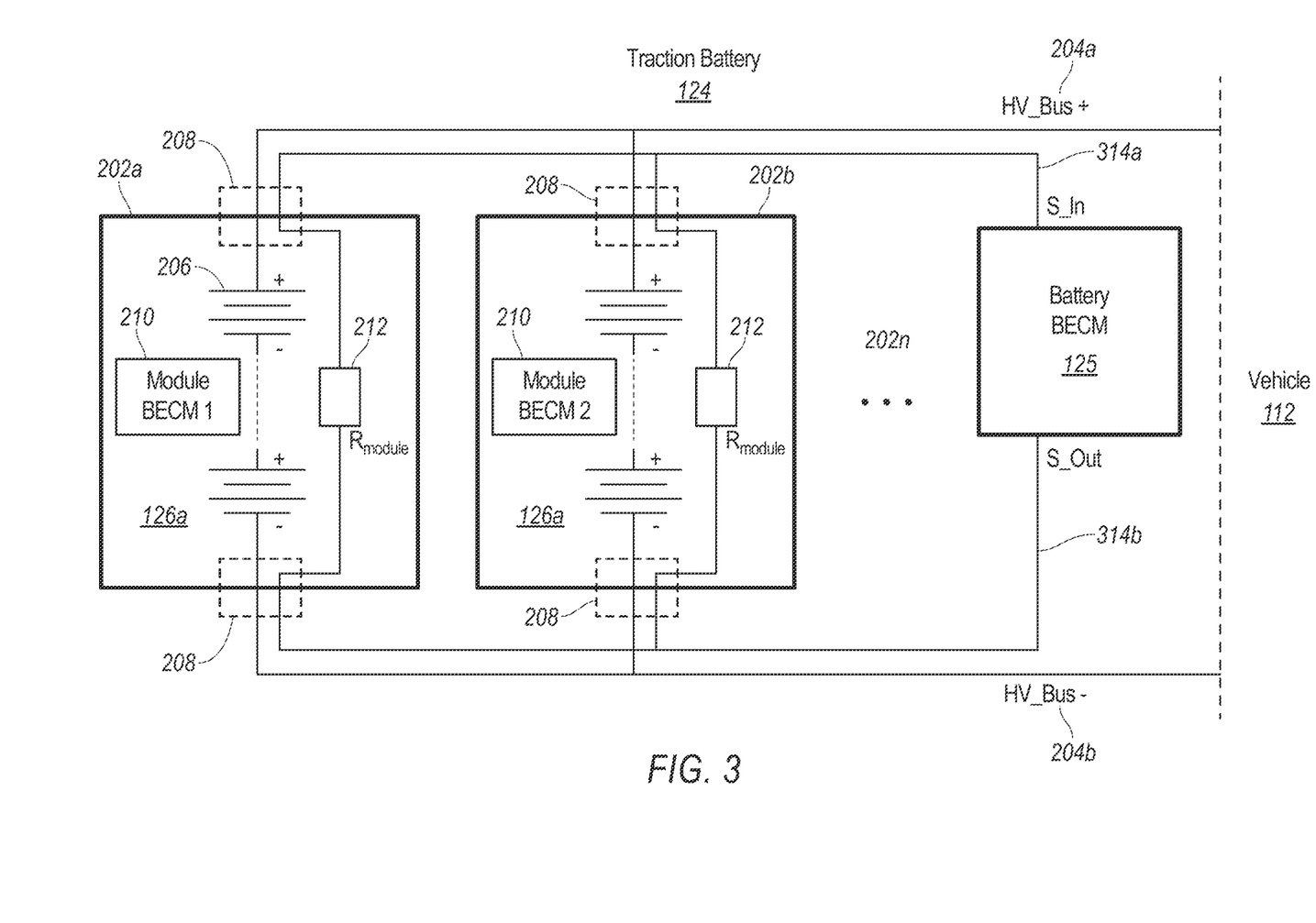
FIG. 3 is an example circuit diagram for another modular battery pack.

Referring to FIG. 3, an example circuit diagram of another modular traction battery pack circuit is illustrated. Different from the circuit illustrated with reference to FIGS. 2A and 2B, in the present example, the module resistors 212 are connected in parallel between an input signal line S_In 314a and an output signal line S_Out 314b. The parallel resistance between the input and output signal lines may be calculated using the following equation:

$$R_{Parallel} = \frac{1}{n\left(\frac{1}{R_{Module}}\right)}$$

wherein n represents the number of module resistors presented in the circuit. Therefore, $$n = \frac{R_{Module}}{R_{Parallel}}$$

Since the Module resistance $R_{Module}$ is known and the parallel resistance $R_{Parallel}$ may be measured by the BECM 125, the number of module resistors 212 and therefore the number of battery modules 126 may be determined by the BECM 125.

Figure 4:
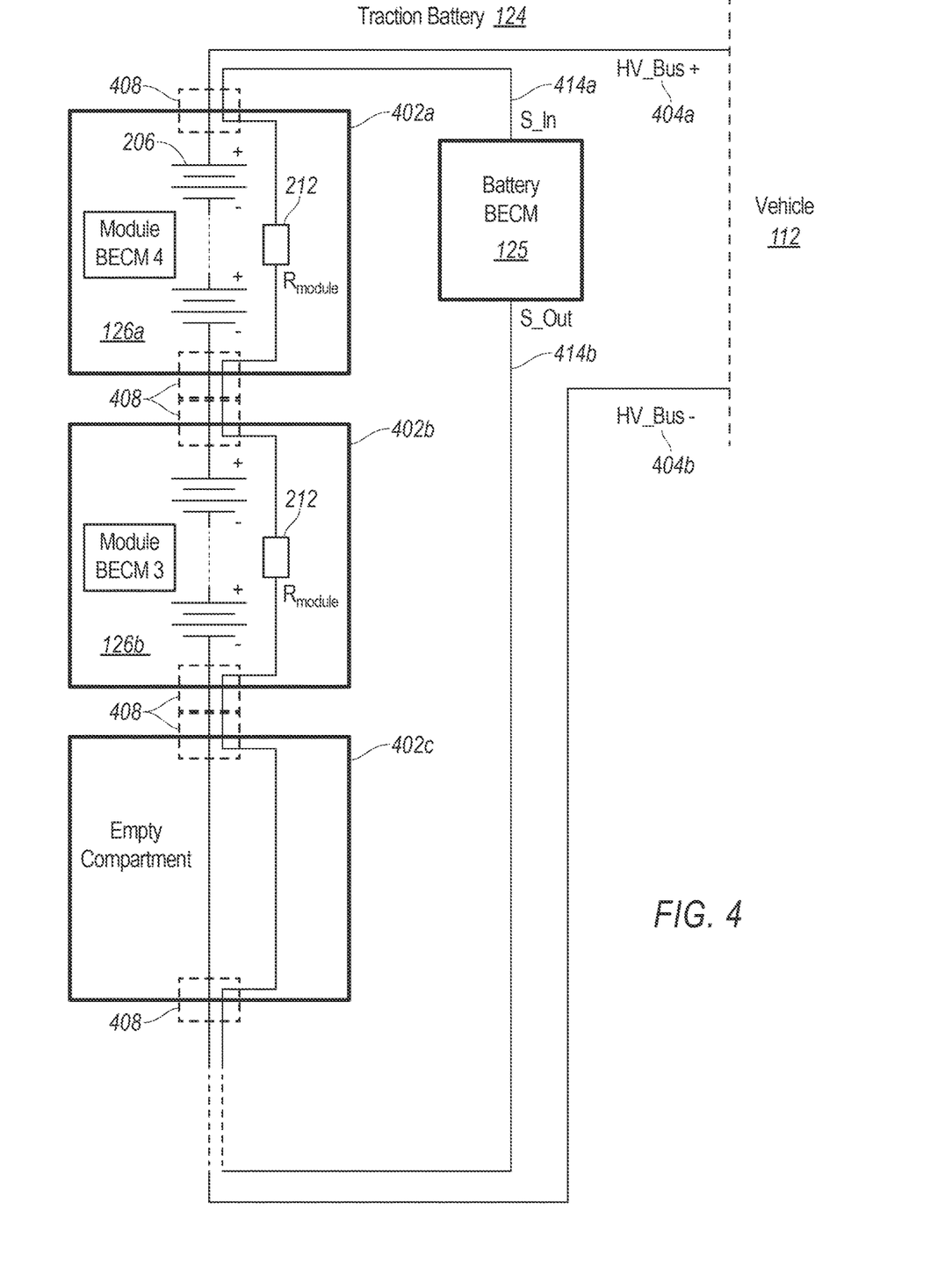
FIG. 4 is an example circuit diagram for yet another modular battery pack.

Referring to FIG. 4, an example circuit diagram of yet another modular traction battery pack circuit is illustrated. Different from the circuit illustrated with reference to FIGS. 2A and 2B, in the present example, the battery modules 126 and the battery compartments 402 are connected in series between positive HV_Bus+ 404a and negative HV_Bus– 404b. Similar to the example illustrated with reference to FIGS. 2A and 2B, the module resistors 212 of each battery module 126 are connected in series between an input signal line S_In 414a and an output signal line S_Out 414b. Therefore, the main BECM 125 of the present example may determine the number of battery modules that are installed in the battery pack 124 in substantially the same manner as the example as introduced above with reference to FIGS. 2A and 2B.

The utilization of the module resistors 212 in combination with the module BECM 210 in each battery module 126 may provide a more robust system for the main BECM 125 to determine the total number of battery modules 126 installed in the traction battery pack 124.

In certain alternative embodiments, passive circuit elements, such as inductors and capacitors, may be used instead of resistors. In these embodiments, the main BECM 125 may output an AC current of known frequency on the circuit formed by the passive circuit elements 212, S_In, and S_Out. Presence of each additional passive circuit element 212 will alter the frequency in a known fashion such that measurement via a current sensor and inspection of the frequency at S_Out can indicate the number of battery modules 126. Bench tests, for example, can be conducted to determine the effect of each additional passive circuit element on the frequency between S_In and S_Out. This information may be stored in a table that maps change in frequency to battery module number so the main BECM 125 can identify during operation the number of battery modules 126 present.

Figure 5:
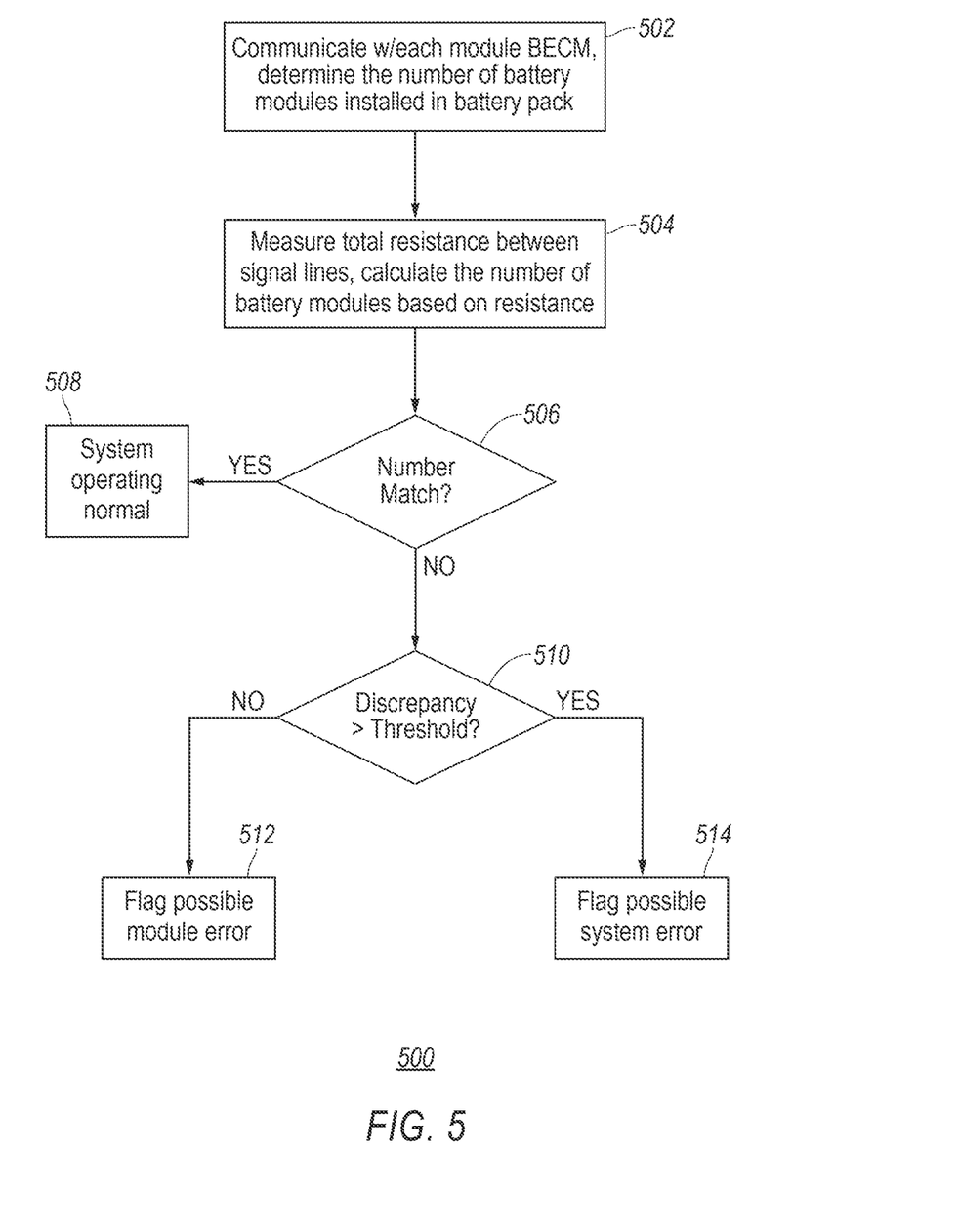
FIG. 5 is an example flow diagram for a battery module detection process.

Referring to FIG. 5, a process 500 for determining the number of battery modules 126 installed in the traction battery pack 124 is illustrated. With continuing reference to FIGS. 1-4, at operation 502 the main BECM 125 communicates with the module BECM 210 of each of the battery modules 126 installed and determines the number of battery modules 126 based on communication with the module BECMs 210. At operation 504, the main BECM 125 measures the total resistance between the input signal line S_In and output signal line S_Out and calculates the number of module resistors 212 based on the resistance as measured. In the present example, the value of each of the module resistors 212 may be previously provided to the main BECM 125. Alternatively, the value of the module resistors 212 may be sent to the BECM 125 by their corresponding module BECM 125 at operation 502. At operation 506, the main BECM 125 compares the number of battery modules determined at operation 502 with the number calculated at operation 504 to determine if the two numbers match. If the answer is a yes, the process proceeds to operation 508, and the BECM 125 flags the system as operating normally. During such normal operation, the main BECM 125 may establish or otherwise update power limits for the battery pack 124 on the basis of the number of confirmed modules. For example, the presence of three confirmed modules may yield an upper power limit derived in known fashion of $\eta$ whereas the presence of 6 confirmed modules may yield an upper power limit derived in known fashion of $\zeta$, where $\zeta$ is greater than $\eta$. The battery pack 124 may then be discharged or charged without violating the upper power limit.

Responsive to detecting a discrepancy between the two numbers, the process proceeds to operation 510 and the main BECM 125 further determines if the discrepancy in the number exceeds a predetermined threshold (e.g., 1). If the discrepancy does not exceed the predetermined threshold, the process proceeds to operation 512 to flag a possible module error as a small discrepancy may be more likely caused by errors within one or more battery modules 126. Otherwise, if the discrepancy exceeds the threshold, the process proceeds to operation 514 and the BECM 125 flags a possible system error as a greater discrepancy may be more likely caused by errors within the battery pack 124 rather than by the individual battery modules 126.

It is noted that although the above description is introduced in the context with an electric vehicle, the present disclosure is not limited thereto. The concept of the present disclosure may be applied to any battery pack configured to support the modular designs connected in series, in parallel, and/or in combination thereof. As a few non-limiting examples, the present disclosure may be applied to a home energy system (HES) having one or more modular batteries, a station or portable device having one or more modular batteries or the like.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as Read Only Memory (ROM) devices and information alterably stored on writeable storage media such as floppy disks, magnetic tapes, Compact Discs (CDs), Random Access Memory (RAM) devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure.

As previously described, the features of various embodiments can be combined to form further embodiments that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle traction battery system comprising:
   a high voltage bus;
   a primary controller; and
   a plurality of cell modules each including a battery cell, a resistive element isolated from the battery cell, and a secondary controller in communication with the primary controller, wherein the battery cells are electrically connected with the high voltage bus and the resistive elements are electrically connected in series or parallel and electrically connected with the primary controller,
   wherein the primary controller is programmed to,
      responsive to signals from the secondary controllers indicative of a total number of the cell modules and a measured resistance of the resistive elements being indicative of a same total number of the cell modules, operate the battery cells according to power limits defined by the total number, and
      responsive to the signals and the measured resistance being indicative of different total numbers of the cell modules, set an error flag.

2. The system of claim 1, wherein operating the battery cells includes charging or discharging the battery cells.

3. The system of claim 1, wherein the battery cells are electrically connected in series.

4. The system of claim 1, wherein the battery cells are electrically connected in parallel.

5. A battery system comprising:
a primary controller; and
a plurality of cell modules each including a battery cell, a passive circuit element isolated from the battery cell, and a secondary controller in communication with the primary controller, wherein the passive circuit elements are electrically connected in series or parallel and electrically connected with the primary controller,
wherein the primary controller is programmed to,
responsive to signals from the secondary controllers indicative of a total number of the cell modules and a measured parameter associated with the passive circuit elements being indicative of a same total number of the cell modules, operate the battery cells according to power limits defined by the total number, and
responsive to the signals and the measured parameter being indicative of different total numbers of the cell modules, set an error flag.

6. The system of claim 5, wherein the passive circuit elements are resistors and the measured parameter is resistance.

7. The system of claim 5, wherein the passive circuit elements are capacitors and the measured parameter is frequency.

8. The system of claim 5, wherein the passive circuit elements are inductors and the measured parameter is frequency.

9. The system of claim 5, wherein operating the battery cells includes charging or discharging the battery cells.

10. The system of claim 5, wherein the battery cells are electrically connected in series.

11. The system of claim 5, wherein the battery cells are electrically connected in parallel.

12. A vehicle comprising:
an electric machine;
a traction battery pack including a plurality of cell modules electrically connected with the electric machine, each of the cell modules including a housing having a battery cell, a passive circuit element isolated from the battery cell, and a module controller contained therein, wherein the passive circuit elements are electrically connected in series or parallel; and
a battery controller in communication with each of the module controllers, electrically connected with the passive circuit elements, and being configured to, responsive to signals from the module controllers indicative of a total number of the cell modules and a measured parameter associated with the passive circuit elements being indicative of a same total number of the cell modules, operate the battery cells according to power limits defined by the total number.

13. The vehicle of claim 12, wherein the battery controller is further configured to, responsive to signals from the module controllers indicative of the total number of the cell modules and the measured parameter being indicative of a different total number of the cell modules, set a flag indicating an error.

14. The vehicle of claim 12, wherein the passive circuit elements are resistors and the measured parameter is resistance.

15. The vehicle of claim 12, wherein the passive circuit elements are capacitors and the measured parameter is frequency.

16. The vehicle of claim 12, wherein the passive circuit elements are inductors and the measured parameter is frequency.

17. The vehicle of claim 12, wherein operating the battery cells includes charging or discharging the battery cells.

18. The vehicle of claim 12, wherein the battery cells are electrically connected in series.

19. The vehicle of claim 12, wherein the battery cells are electrically connected in parallel.

* * * * *